United States Patent
Eberbach et al.

(10) Patent No.: US 9,599,986 B1
(45) Date of Patent: Mar. 21, 2017

(54) EMERGENCY AUTOMATED VEHICLE CONTROL SYSTEM TO MONITOR EMERGENCY MEDICAL EVENTS THROUGH BODY AREA NETWORKS

(71) Applicant: International Business Machines Corporation, Armonk, NY (US)

(72) Inventors: Adam Harley Eugene Eberbach, Surrey Hills (AU); John M. Wagner, Plainville, CT (US); Carolyn A. Whitehead, Norwich, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/978,352

(22) Filed: Dec. 22, 2015

(51) Int. Cl.
*G05D 1/00* (2006.01)

(52) U.S. Cl.
CPC ................... *G05D 1/0061* (2013.01)

(58) Field of Classification Search
None
See application file for complete search history.

(56) References Cited

U.S. PATENT DOCUMENTS

| | | | | |
|---|---|---|---|---|
| 6,104,296 A * | 8/2000 | Yasushi | ............. | A61B 5/04085 180/272 |
| 6,575,902 B1 * | 6/2003 | Burton | ..................... | A61B 5/18 340/575 |
| 6,603,999 B2 * | 8/2003 | SerVaas | ................... | A61N 1/39 607/5 |
| 6,734,799 B2 * | 5/2004 | Munch | ................... | G08B 21/06 340/435 |
| 6,756,903 B2 * | 6/2004 | Omry | ................... | B60K 28/066 340/425.5 |
| 7,605,694 B2 * | 10/2009 | Prost-Fin | ............... | B60K 35/00 340/438 |
| 8,078,334 B2 * | 12/2011 | Goodrich | ........... | A61B 5/14546 119/771 |
| 8,684,938 B2 * | 4/2014 | Sakai | ................... | A61B 5/4035 600/481 |
| 8,698,639 B2 * | 4/2014 | Fung | ...................... | B60K 28/06 340/576 |
| 8,704,669 B2 * | 4/2014 | Strumolo | ........... | B60H 1/00771 340/438 |
| 8,870,782 B2 * | 10/2014 | Futatsuyama | ...... | A61B 5/02125 600/485 |
| 8,874,301 B1 * | 10/2014 | Rao | ...................... | B60K 28/066 180/272 |
| 8,954,217 B1 | 2/2015 | Montemerlo et al. | | |
| 9,144,389 B2 * | 9/2015 | Srinivasan | ........... | A61B 5/0408 |
| 9,292,471 B2 * | 3/2016 | Fung | ..................... | B60W 40/09 |
| 2003/0073886 A1 * | 4/2003 | Yanagidaira | ............. | A61B 5/18 600/300 |

(Continued)

*Primary Examiner* — Jonathan M Dager
(74) *Attorney, Agent, or Firm* — Cantor Colburn LLP

(57) ABSTRACT

Embodiments are directed to an automated control system having a memory and a processor system communicatively coupled to the memory. The processor system is configured to perform a method including determining that a body area network of an occupant of a vehicle has reported, during operation of the vehicle, a medical emergency event, and controlling operation of the vehicle based at least in part on the determination that the body area network of the occupant has reported an emergency event.

20 Claims, 6 Drawing Sheets

(56) References Cited

U.S. PATENT DOCUMENTS

| | | | | |
|---|---|---|---|---|
| 2003/0097047 | A1* | 5/2003 | Woltermann | A61B 5/165 600/300 |
| 2007/0265540 | A1* | 11/2007 | Fuwamoto | A61B 5/04525 600/515 |
| 2008/0252466 | A1* | 10/2008 | Yopp | B60K 28/066 340/576 |
| 2008/0258890 | A1* | 10/2008 | Follmer | B60R 25/102 340/439 |
| 2009/0270705 | A1* | 10/2009 | Enegren | A61B 5/0031 600/365 |
| 2010/0049068 | A1* | 2/2010 | Fuwamoto | A61B 5/0408 600/509 |
| 2012/0059227 | A1* | 3/2012 | Friedlander | A61B 5/0022 600/300 |
| 2014/0300490 | A1* | 10/2014 | Kotz | A61B 5/0028 340/870.3 |
| 2015/0149021 | A1* | 5/2015 | Duncan | A61B 5/18 701/23 |
| 2015/0276415 | A1* | 10/2015 | Shrinath | G01C 21/36 701/1 |
| 2016/0071418 | A1* | 3/2016 | Oshida | G08G 1/22 701/23 |

\* cited by examiner

EMERGENCY AUTOMATED VEHICLE CONTROL SYSTEM TO MONITOR EMERGENCY MEDICAL EVENTS THROUGH BODY AREA NETWORKS

BACKGROUND

The present disclosure relates in general to monitoring and responding to emergency medical events. More specifically, the present disclosure relates to automated computing systems and methodologies to initiate or take over control of an autonomous vehicle operating system in response to detecting an emergency medical event of a vehicle occupant during a journey.

A vehicle driver experiencing a medical emergency such as a heart attack or a stroke during a journey may not be capable of sufficiently interacting with the vehicle to direct it to a place of assistance. Medical emergency events leading to incapacity or impairment of a vehicle driver can lead to accidents involving property damage, injury or death. Even if the vehicle occupant experiencing the emergency event is a passenger and another occupant is operating in the vehicle, the vehicle operator may or may not know or be able to execute with precision and speed the proper sequence of actions that are necessary to respond effectively to the medical emergency event. For many emergency medical events, the success rate of the emergency response treatment depends on how quickly the treatment can be administered after the start of the emergency medical event.

It would be beneficial to provide automated computing systems and methodologies that take control of a vehicle in response to detecting an emergency medical event of a vehicle occupant during a journey.

SUMMARY

Embodiments are directed to a computer implemented method of operating an automated control system. The method includes determining, by a processor system, that a body area network of an occupant of a vehicle has reported, during operation of the vehicle, a medical emergency event. The method further includes initiating, by the processor system, a control protocol that controls operation of the vehicle based at least in part on the determination that the body area network of the occupant has reported an emergency event.

Embodiments are further directed to an automated control system having a memory and a processor system communicatively coupled to the memory. The processor system is configured to perform a method including determining that a body area network of an occupant of a vehicle has reported, during operation of the vehicle, a medical emergency event, and controlling operation of the vehicle based at least in part on the determination that the body area network of the occupant has reported an emergency event.

Embodiments are further directed to a computer program product for operating an automatic control system. The computer program product includes a computer readable storage medium having program instructions embodied therewith, wherein the computer readable storage medium is not a transitory signal per se. The program instructions are readable by a processor system to cause the processor system to perform a method. The method includes determining that a body area network of an occupant of a vehicle has reported, during operation of the vehicle, a medical emergency event, and controlling operation of the vehicle based at least in part on the determination that the body area network of the occupant has reported an emergency event.

Additional features and advantages are realized through the techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as the present disclosure is particularly pointed out and distinctly claimed in the claims at the conclusion of the specification. The foregoing and other features and advantages are apparent from the following detailed description taken in conjunction with the accompanying drawings in which:

Figure 1:
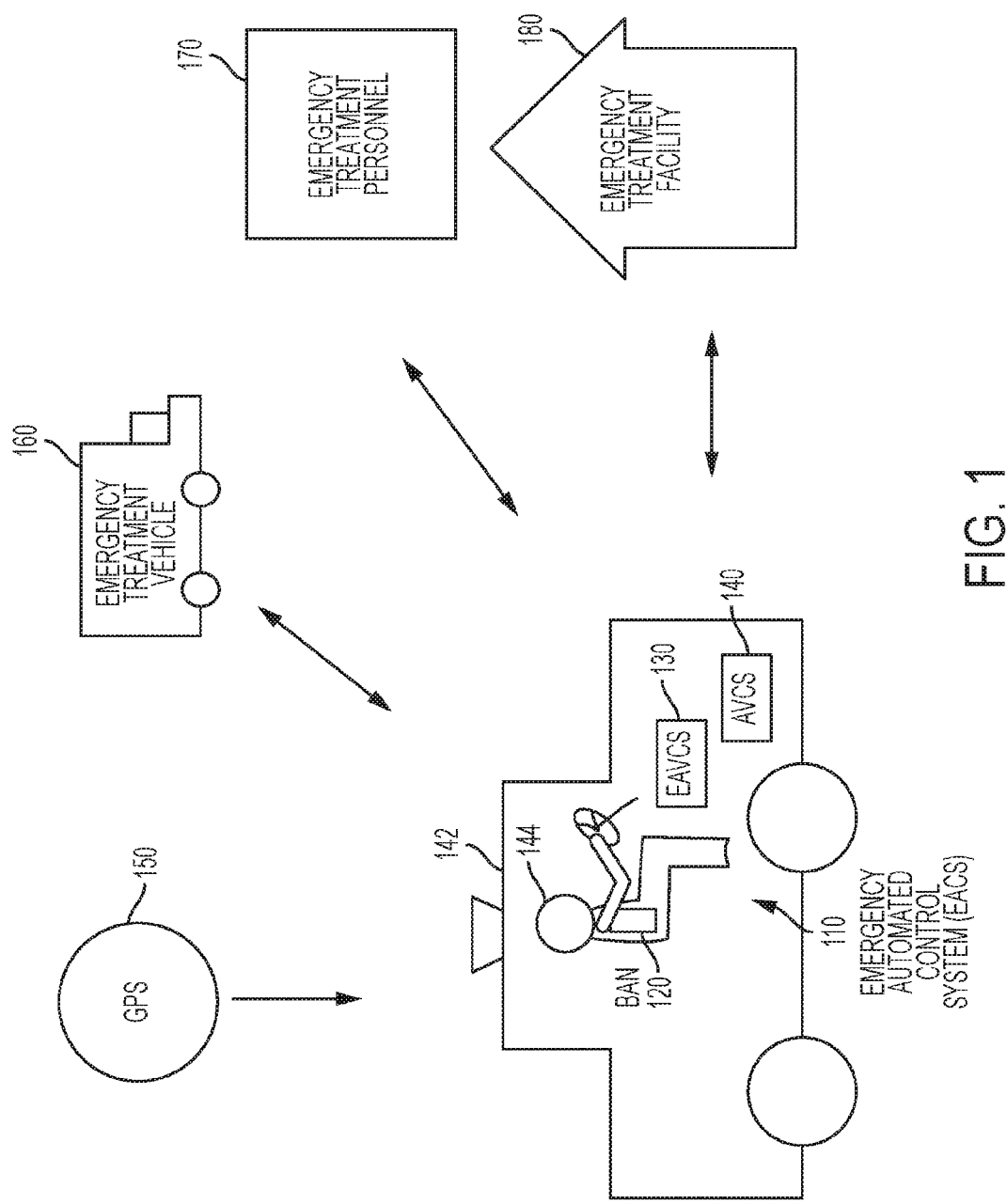
FIG. 1 depicts an emergency automated control system (EACS) according to one or more embodiments.

In the accompanying figures and following detailed description of the disclosed embodiments, the various elements illustrated in the figures are provided with three or four digit reference numbers. The leftmost digit(s) of each reference number corresponds to the figure in which its element is first illustrated.

DETAILED DESCRIPTION

Various embodiments of the present disclosure will now be described with reference to the related drawings. Alternate embodiments may be devised without departing from the scope of this disclosure. It is noted that various connections are set forth between elements in the following description and in the drawings. These connections, unless specified otherwise, may be direct or indirect, and the present disclosure is not intended to be limiting in this respect. Accordingly, a coupling of entities may refer to either a direct or an indirect connection.

Turning now to an overview of the present disclosure, one or more embodiments provide automated computing systems and methodologies that take control of a vehicle in response to detecting an emergency medical event of a vehicle occupant during a journey. Using features of the present disclosure, the occupant's body area network (BAN) can communicate through the communications node(s) of the BAN with an emergency automated vehicle control system (EAVCS) and an autonomous vehicle control system (AVCS) of the vehicle. This communication may take a variety of forms. For example, periodically throughout a journey the EAVCS may poll the node, requesting a status update of the occupant's health. Alternatively, a handshaking procedure may be utilized, wherein the BAN periodically advises the EAVCS of the presence of a user with need for monitoring (i.e., initiates monitoring). If communication from the BAN is not received for some time, the EAVCS may detect BAN failure and initiate emergency response. At the conclusion of the journey a reverse handshake procedure could inform the EAVCS that the user with the BAN no longer requires monitoring as they are leaving the vehicle (i.e., ends monitoring).

Whatever communication method is used between the BAN and the EAVCS, if the BAN node reports an adverse condition, the EAVCS may override control of the vehicle and control the AVCS to have it deliver the occupant to the nearest medical facility. Alternatively, the AVCS may be provided with mobile communication systems, and the EAVCS may control the AVCS to communicate over its mobile communications systems with emergency services and to summon an ambulance or other assistance, stopping and awaiting arrival. Alternatively, the EAVCS and the AVCS may be informed of the direction of the approaching emergency vehicle and may continue moving the vehicle to cause a sooner rendezvous with the emergency vehicle. Alternatively, the EAVCS and the AVCS may also select a safe position in which to park the vehicle and await the arrival of the emergency vehicle and communicate this to emergency services.

FIG. 1 depicts an emergency automated control system (EACS) 110 embodying the present disclosure incorporated within a vehicle 142 according to one or more embodiments. While certain aspects of the present disclosure are particularly useful in connection with specific types of vehicles, vehicle 142 may be any type of vehicle including, but not limited to, automobiles, trucks, motorcycles, busses, boats, airplanes, helicopters, lawnmowers, recreational vehicles, amusement park vehicles, farm equipment, construction equipment, trams, golf carts, trains, and trolleys. Vehicle 142 may also include one or more user interfaces (not shown) for allowing communication between EACS 110 and an occupant/operator 144 of vehicle 142. The user interfaces may include status indicators, electronic displays, and user input devices built into the interior of vehicle 142.

EACS 110 includes a BAN 120, an EAVCS 130 and an AVCS 140, configured and arranged as shown. Although EAVCS 130 is depicted in FIG. 1 as a separate unit, its functionality may be incorporated partially or fulling within either BAN 120 or AVCS 140 or both. BAN 120 is worn by or incorporated within occupant 144. A typical configuration of BAN 120 includes vital sign monitoring sensors (not shown), motion detectors (not shown) to help identify the location of the monitored individual, and some form of communication gateway (not shown) to transmit vital sign and motion readings to medical practitioners or caregivers. The various component parts of BAN 120 may be wearable or implantable. Occupant 144 may be operating vehicle 142 during a journey or may be a passenger in vehicle 142 during a journey. EACS 110 may receive and/or transmit data to a variety of external systems or entities, including for example a global positioning satellite (GPS) 150, an emergency treatment vehicle 160, emergency treatment personnel 170 and an emergency treatment facility 180.

In operation, BAN 120, EAVCS 130 and AVCS 140 cooperate to monitor occupant 144 for an emergency medical event, detect the occurrence of an emergency medical event for occupant 144 and, based at least in part on detecting the occurrence of an emergency medical emergency event for occupant 144, implement a control protocol applied to AVCS 140 to take one or more actions to address the detected emergency medical event. The actions include initiating AVCS 140 if AVCS 140 is not currently controlling vehicle 142, taking over control of AVCS 140 if AVCS 140 is not currently controlling vehicle 142, controlling AVCS 140 to navigate vehicle 142 to emergency treatment vehicle 160, controlling AVCS 140 to navigate vehicle 142 to emergency treatment facility 180, downloading from BAN 120 a log of data relevant to the emergency medical event and transmitting notification of the emergency medical event and/or the BAN data log to emergency treatment vehicle 160, emergency treatment personnel 170 and emergency treatment facility 180.

Figure 2:
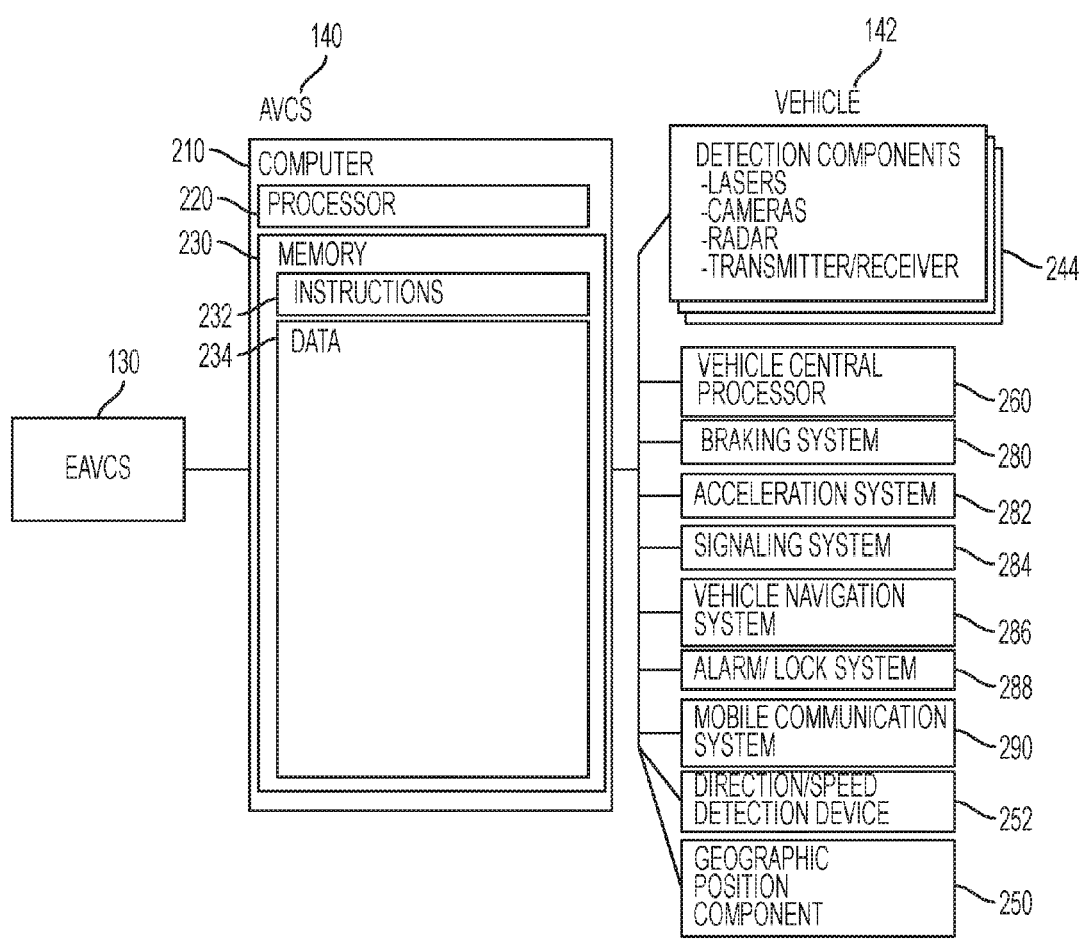
FIG. 2 depicts an autonomous vehicle control system (AVCS) according to one or more embodiments.

Example implementations of AVCS 140, BAN 120 and EAVCS 130 will now be provided with reference to FIGS. 2-6. Referring now to FIG. 2, there is depicted an example implementation of AVCS 140 according to one or more embodiments. AVCS 140 includes a computer 210 containing a processor 220, memory 230, instructions 232 and data 234. Processor 220 may be any conventional processor, such as commercially available CPUs. Alternatively, processor 220 may be a dedicated device such as an ASIC or other hardware-based processor. Although FIG. 2 functionally illustrates the processor, memory, and other elements of computer 210 as being within the same block, it will be understood by those of ordinary skill in the art that the processor, computer, or memory may actually comprise multiple processors, computers, or memories that may or may not be stored within the same physical housing. In various aspects described herein, processor 220 may be located remotely from vehicle 142 and communicate with vehicle 142 wirelessly. In other aspects, some of the processes described herein are executed on a processor disposed within vehicle 142 and others by a remote processor.

Memory 230 stores information accessible by processor 220, including instructions 232 and data 234 that may be executed or otherwise used by processor 220. Memory 230 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories.

Instructions 232 may be any set of instructions to be executed directly (such as machine code) or indirectly (such as scripts) by processor 220. Data 234 includes detailed map information and traffic pattern model information and may be retrieved, stored or modified by processor 220 in accordance with instructions 232. Data 234 may comprise any information sufficient to identify the relevant information, such as numbers, descriptive text, proprietary codes, references to data stored in other areas of the same memory or different memories (including other network locations) or information that is used by a function to calculate the relevant data.

Computer 210 communicates with various components of vehicle 142. For example, computer 210 communicates with one or more sensors 244 of vehicle 142 for detecting objects external to vehicle 142 such as other vehicles, obstacles in the roadway, traffic signals, signs, trees, etc. Sensors 244 may include lasers, sonar, radar, cameras or any other detection devices which record data to be processed by computer 210. Computer 210 also communicates with a vehicle central processor 260 and may send and receive information from the various systems of vehicle 142, for example a braking system 280, an acceleration system 282, a signaling system 284, a navigation system 286, an alarm/lock system 288 and a mobile communications system 290 in order to control the movement, speed, etc. of vehicle 142. When engaged, computer 210 may control some or all of these functions of vehicle 142 and thus be fully or merely partially autonomous.

Vehicle 142 may also have one or more components for detecting the status of the vehicle. For example, vehicle 142 may include a geographic position component 250 in communication with computer 210 for determining the geographic location of the device. Geographic position component 250 may include a GPS receiver (not shown) to determine the device's latitude, longitude and/or altitude position. Other location systems such as laser-based localization systems, inertial-aided GPS, or camera-based localization may also be used to identify the location of vehicle 142. The location of vehicle 142 may include an absolute geographical location, such as latitude, longitude, and altitude as well as relative location information, such as location relative to other vehicles immediately around it which can often be determined with less noise than absolute geographical location.

Vehicle 142 may also include an accelerometer, gyroscope or other direction/speed detection device 252 to determine the direction and speed of vehicle 142 or changes thereto. By way of example only, direction/speed detection device 252 may determine its pitch, yaw or roll (or changes thereto) relative to the direction of gravity or a plane perpendicular thereto. Direction/speed detection device 252 may also track increases or decreases in speed and the direction of such changes.

Figure 3:
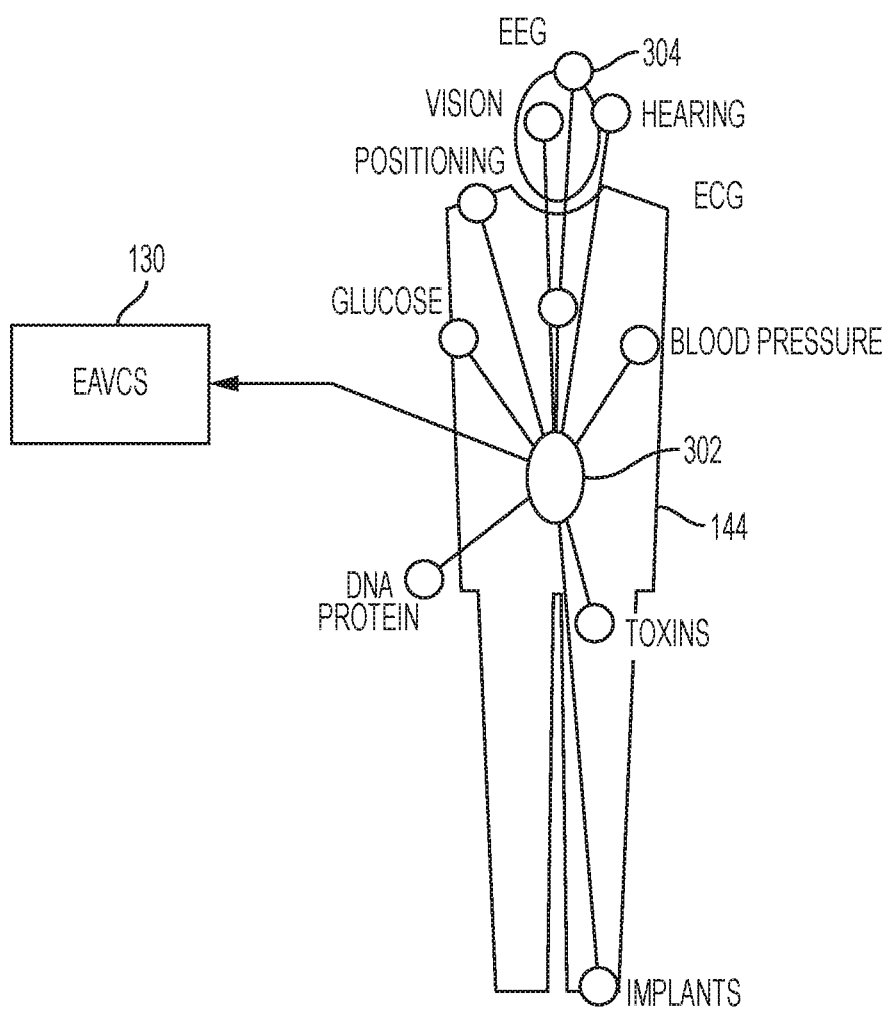
FIG. 3 depicts a body area network (BAN) according to one or more embodiments.

FIG. 3 depicts an example implementation of BAN 120 of occupant 144 according to one or more embodiments. BAN 120 is a wireless network of wearable and/or implantable computing devices/sensor 304 and a central gateway wearable and/or implantable computing device/sensor 302. For ease of illustration, only one wearable and/or implantable computing device/sensor 302 shown in FIG. 3 is provided with a reference number. Computing devices/sensors 304 monitor medical conditions of occupant 144, including for example DNA protein levels, blood glucose levels, body positioning, vision, EEG, hearing, ECG, blood pressure, toxin levels, and the general status of any implants. Central gateway computing device/sensor 302 receives status data from computing devices/sensors 304. Central gateway computing device/sensor 302 assembles data logs of the operation of computing devices/sensors 304, detects emergency medical events at any or all of computing devices/sensors 304, transmits in response to detecting data that represents a medical emergency event a signal or other communication identifying the medical emergency event to EAVCS 130, and transmits in response to detecting data that represents a medical emergency the data logs of one or all of computing devices/sensors 304 to EAVCS 130. In alternative embodiments, central gateway computing device/sensor 302 may be bypassed the functionality of central gateway computing device/sensor 302 may be implemented in a distributed fashion at computing devices/sensors 304.

Figure 4:
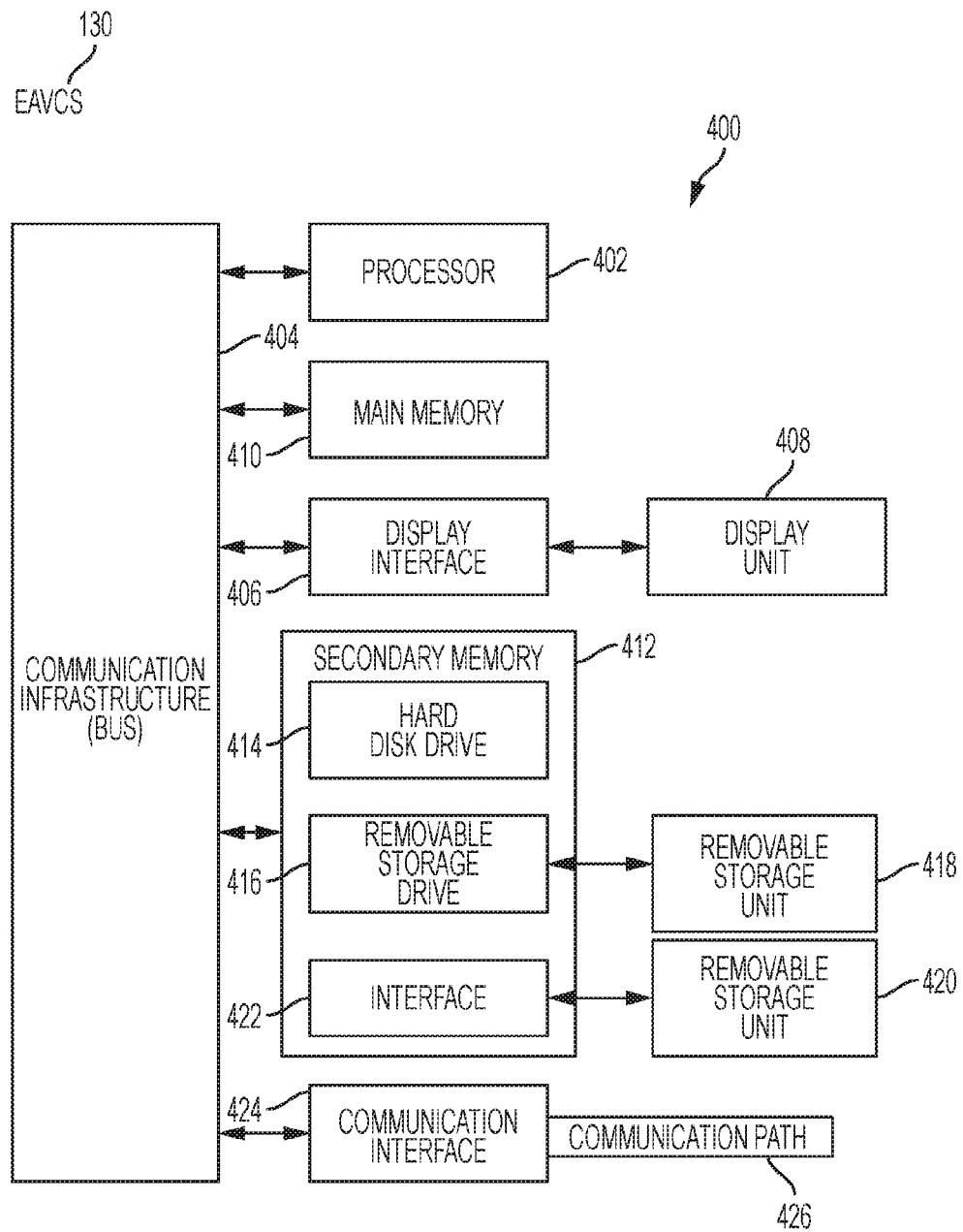
FIG. 4 depicts an exemplary hardware implementation of an emergency automated vehicle control system (EAVCS) according to one or more embodiments.

FIG. 4 depicts an exemplary hardware implementation of EAVCS 130 according to one or more embodiments. EAVCS 130 may be implemented as a computer system 400. Although one exemplary computer system 400 is shown, computer system 400 includes a communication path 426, which connects computer system 400 to additional systems and may include one or more wide area networks (WANs) and/or local area networks (LANs) such as the internet, intranet(s), and/or wireless communication network(s). Computer system 400 and additional system are in communication via communication path 426, e.g., to communicate data between them.

Computer system 400 includes one or more processors, such as processor 402. Processor 402 is connected to a communication infrastructure 404 (e.g., a communications bus, cross-over bar, or network). Computer system 400 can include a display interface 406 that forwards graphics, text, and other data from communication infrastructure 404 (or from a frame buffer not shown) for display on a display unit 408. Computer system 400 also includes a main memory 410, preferably random access memory (RAM), and may also include a secondary memory 412. Secondary memory 412 may include, for example, a hard disk drive 414 and/or a removable storage drive 416, representing, for example, a floppy disk drive, a magnetic tape drive, or an optical disk drive. Removable storage drive 416 reads from and/or writes to a removable storage unit 418 in a manner well known to those having ordinary skill in the art. Removable storage unit 418 represents, for example, a floppy disk, a compact disc, a magnetic tape, or an optical disk, etc. which is read by and written to by removable storage drive 416. As will be appreciated, removable storage unit 418 includes a computer readable medium having stored therein computer software and/or data.

In alternative embodiments, secondary memory 412 may include other similar means for allowing computer programs or other instructions to be loaded into the computer system. Such means may include, for example, a removable storage unit 420 and an interface 422. Examples of such means may include a program package and package interface (such as that found in video game devices), a removable memory chip (such as an EPROM, or PROM) and associated socket, and other removable storage units 420 and interfaces 422 which allow software and data to be transferred from the removable storage unit 420 to computer system 400.

Computer system 400 may also include a communications interface 424. Communications interface 424 allows software and data to be transferred between the computer system and external devices. Examples of communications interface 424 may include a modem, a network interface (such as an Ethernet card), a communications port, or a PCM-CIA slot and card, etcetera. Software and data transferred via communications interface 424 are in the form of signals which may be, for example, electronic, electromagnetic, optical, or other signals capable of being received by communications interface 424. These signals are provided to communications interface 424 via communication path (i.e., channel) 426. Communication path 426 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 410 and secondary memory 412, removable storage drive 416, and a hard disk installed in hard disk drive 414. Computer programs (also called computer control logic) are stored in main memory 410 and/or secondary memory 412. Computer programs may also be received via communications interface 424. Such computer programs, when run, enable the computer system to perform the features of the present disclosure as discussed herein. In particular, the computer programs, when run, enable processor 402 to perform the features of the computer system. Accordingly, such computer programs represent controllers of the computer system.

Figure 5:
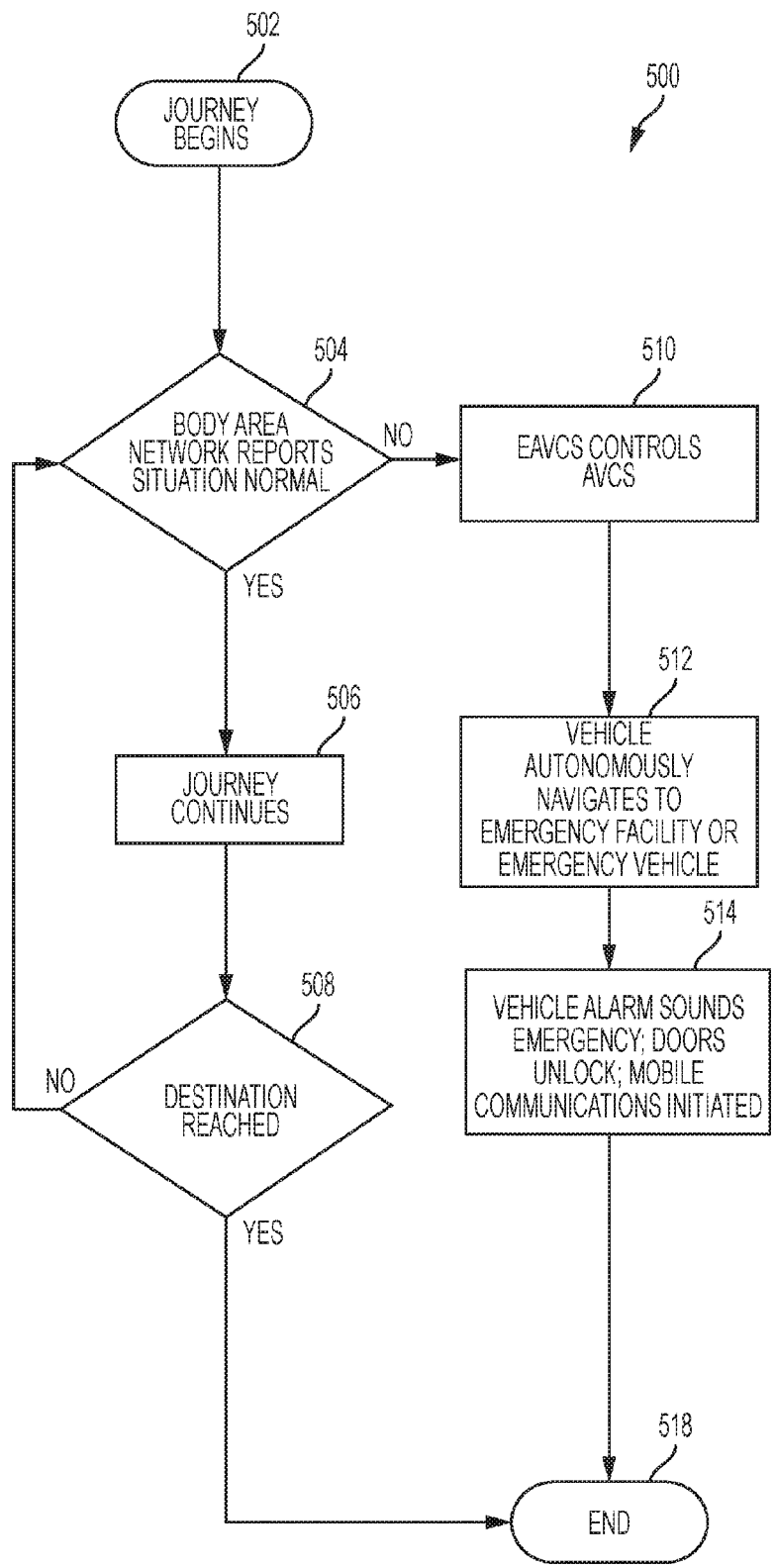
FIG. 5 depicts a flow diagram illustrating a methodology of the EAVCS shown in FIG. 4.

FIG. 5 depicts a flow diagram illustrating a methodology 500 of EAVCS 130 shown in FIGS. 1-4. Methodology 500 begins at block 502, wherein a journey in vehicle 142 begins. Occupant 144 may be operating vehicle 142 during the journey, or may be passenger in vehicle 142 during the journey. Vehicle 142 may be operating under manual control of occupant 144 or another occupant, or vehicle 142 may be operating under control of AVCS 140. Block 504 determines whether BAN 120 is reporting normal conditions indicating there is no medical emergency event. If the response to the inquiry at decision block 504 is yes, methodology 500 proceeds to block 506, which continues the journey. Decision block 508 after a predetermined time period inquires whether the destination has been reached (e.g., engine is shut off, GPS readings, etc.). If the answer to the inquiry at decision block 508 is yes, methodology 500 proceeds to block 518 and ends. If the answer to the inquiry at decision block 508 is no, methodology 500 returns to decision block 504.

If the response to the inquiry at decision block 504 is no, methodology 500 downloads the BAN data log from BAN 120 to EAVCS 130, indicates to EAVCS 130 that an emergency medical event has occurred, provides in addition to BAN data log relevant data of the emergency event (time, likely reason, etc.) and proceeds to block 510, which transfers control of AVCS 140 to EAVCS 130 if AVCS 140 is already activated, or initiates EAVCS 130 control of AVCS 140 if AVCS 140 is not currently activated (i.e., vehicle 142 is operating under manual control). In block 512, EAVCS 130 controls AVCS 140 to navigate vehicle 142 to emergency treatment vehicle 170 or emergency medical treatment facility 180. In block 514, EAVCS 130 controls AVCS 140 to initiate vehicle alarm/lock system 288, and/or transmit mobile communications over mobile communication system 290. The transmitted mobile communications may be to emergency treatment vehicle 160, emergency treatment personnel 170 or emergency treatment facility 180. The transmitted mobile communication may include that an emergency medical event has occurred, BAN data log, relevant data of the emergency event (time, likely reason, etc.) and relevant data of vehicle 142 (e.g., location of vehicle 142, estimated time of arrival at emergency treatment vehicle 160 or emergency treatment facility 180, route being taken. The transmitted mobile communication may also communicate with emergency services and to summon emergency treatment vehicle 160, stopping and awaiting arrival. Alternatively, the transmitted mobile communication include that vehicle 142 will under control of EAVCS 130 and AVCS 140 select a safe position in which to park and await the arrival of emergency treatment vehicle 160.

In one or more embodiments, mobile communications can include communications and/or controls into EAVCS 130. For example, upon receiving a mobile communication that occupant 144 has suffered stroke while driving vehicle 142, and that vehicle 142 is being driven under AVCS 140 to emergency treatment center 180, emergency treatment personnel 170 may determine that another medical treatment facility would be more appropriate and provide a response mobile communication to EAVCS 130 with a request that it control AVCS 140 to drive vehicle 142 to the alternative medical treatment facility. Alternatively, EAVCS 130 and AVCS 140 may be informed of the direction of approaching emergency treatment vehicle 160 and control vehicle 142 to continue moving to cause a sooner rendezvous with emergency treatment vehicle 160.

Thus it can be seen from the foregoing detailed description that the present disclosure provides a number of technical benefits. According to the present disclosure, automated computing systems and methodologies are provided that take control of a vehicle in response to detecting an emergency medical event of a vehicle occupant during a journey. Using features of the present disclosure, the occupant's BAN can communicate with the vehicle through the communications node(s) of the BAN. Periodically throughout a journey the vehicle polls the node, requesting a status update of the occupant's health. If the node reports an adverse condition, an autonomous control of the vehicle may override control of the vehicle and deliver the occupant to the nearest medical facility. Alternatively, the autonomous vehicle control may be provided with mobile communication systems to communicate with emergency services and to summon an ambulance or other assistance, stopping and awaiting arrival. Alternatively, the autonomous vehicle may be informed of the direction of the approaching emergency vehicle and may continue moving to cause a sooner rendezvous with the emergency vehicle. Alternatively, the autonomous vehicle control may also select a safe position in which to park and await the arrival of the emergency vehicle and communicate this to emergency services.

Figure 6:
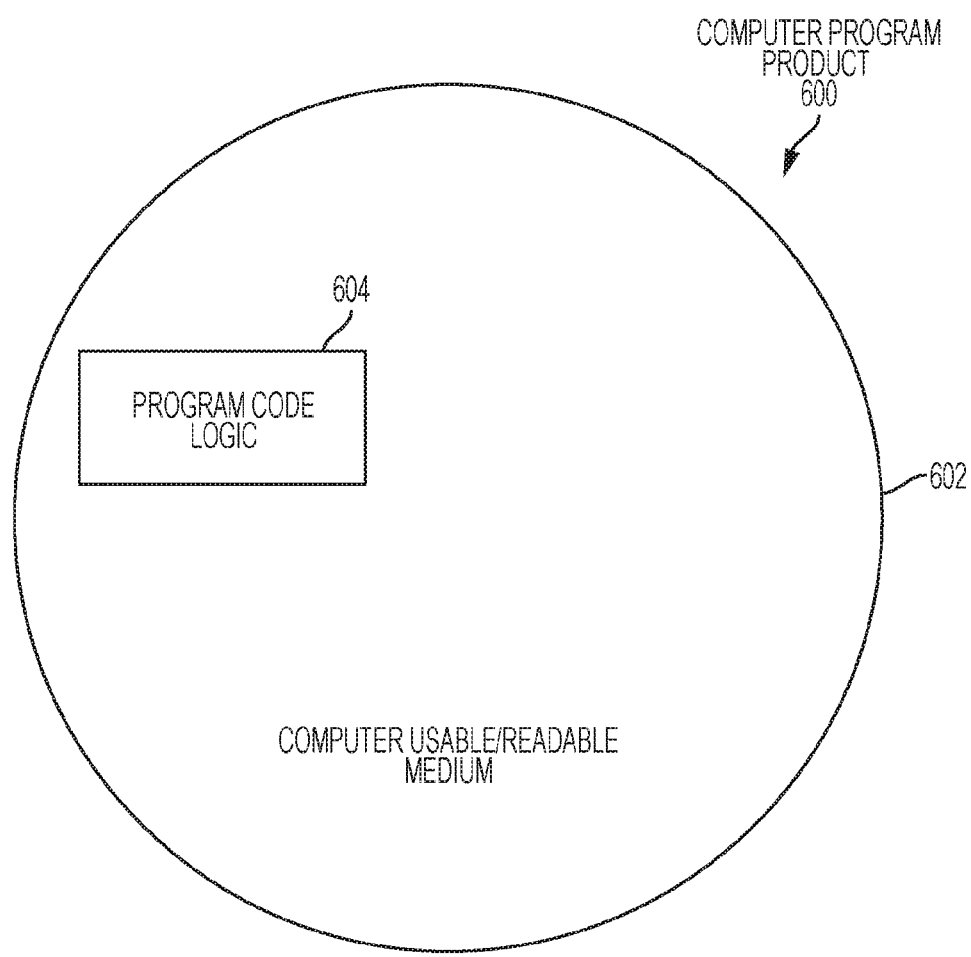
FIG. 6 depicts a computer program product in accordance with one or more embodiments.

Referring now to FIG. 6, a computer program product 600 in accordance with an embodiment that includes a computer readable storage medium 602 and program instructions 604 is generally shown.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

It will be understood that those skilled in the art, both now and in the future, may make various improvements and enhancements which fall within the scope of the claims which follow.

What is claimed is:

1. A computer implemented method of operating an automated control system, the method comprising:
    determining, by a processor system, that a body area network of an occupant of a vehicle has reported, during operation of the vehicle, a medical emergency event;
    initiating, by the processor system, a control protocol that controls operation of the vehicle based at least in part on the determination that the body area network of the occupant has reported an emergency event; and
    based at least in part on the determination that the body area network of the occupant has reported an emergency event;
    accessing, by the processor system, a data log and additional relevant data of the body area network, wherein the additional relevant data comprises a preliminary diagnosis of the nature of the medical emergency; and
    transmitting the data log and the additional relevant data over a wireless mobile communication system to an emergency treatment facility or a mobile emergency treatment vehicle or an emergency treatment person.

2. The method of claim 1, wherein the control of the operation of the vehicle comprises controlling at least one of a plurality of vehicle systems.

3. The method of claim 2, wherein the at least one of the plurality of vehicle systems comprises an autonomous vehicle control system.

4. The method of claim 3, wherein the controlling of the autonomous vehicle control system comprises controlling the autonomous vehicle control system to direct the vehicle to an emergency treatment facility.

5. The method of claim 3, wherein the controlling of the autonomous vehicle control system comprises controlling the autonomous vehicle control system to direct the vehicle to a mobile emergency treatment vehicle.

6. The method of claim 2, wherein the at least one of the plurality of vehicle systems comprises at least one of the following:
an alarm; and
a door lock.

7. The method of claim 1 further comprising:
receiving, by the processor system, a response to transmitting the data log and the additional relevant data, wherein the response comprises response instructions that are based at least in part on the additional relevant data, and wherein the response instructions control the processor system to change the control protocol to a different control protocol that was selected based at least in part on the additional relevant data.

8. An automated control system comprising:
a memory; and
a processor system communicatively coupled to the memory;
wherein the processor system is configured to perform a method comprising:
determining that a body area network of an occupant of a vehicle has reported, during operation of the vehicle, a medical emergency event;
controlling operation of the vehicle based at least in part on the determination that the body area network of the occupant has reported an emergency event; and
based at least in part on the determination that the body area network of the occupant has reported an emergency event;
accessing a data log and additional relevant data of the body area network, wherein the additional relevant data comprises a preliminary diagnosis of the nature of the medical emergency; and
transmitting the data log and the additional relevant data over a wireless mobile communication system to an emergency treatment facility or a mobile emergency treatment vehicle or an emergency treatment person.

9. The system of claim 8, wherein the controlling of operation of the vehicle comprises controlling at least one of a plurality of vehicle systems.

10. The system of claim 9, wherein the at least one of the plurality of vehicle systems comprises an autonomous vehicle control system.

11. The system of claim 10, wherein the controlling of the autonomous vehicle control system comprises controlling the autonomous vehicle control system to direct the vehicle to an emergency treatment facility.

12. The system of claim 10, wherein the controlling of the autonomous vehicle control system comprises controlling the autonomous vehicle control system to direct the vehicle to a mobile emergency treatment vehicle.

13. The system of claim 9, wherein the at least one of the plurality of vehicle systems comprises at least one of the following:
an alarm; and
a door lock.

14. The system of claim 8 further comprising:
receiving a response to transmitting the data log and the additional relevant data, wherein the response comprises response instructions that are based at least in part on the additional relevant data, and wherein the response instructions control the processor system to control the operation of the vehicle in a manner that was selected based at least in part on the additional relevant data.

15. A computer program product for operating an automatic control system, the computer program product comprising:
a computer readable storage medium having program instructions embodied therewith, wherein the computer readable storage medium is not a transitory signal per se, the program instructions readable by a processor system to cause the processor system to perform a method comprising:
determining that a body area network of an occupant of a vehicle has reported, during operation of the vehicle, a medical emergency event;
controlling operation of the vehicle based at least in part on the determination that the body area network of the occupant has reported an emergency event; and
based at least in part on the determination that the body area network of the occupant has reported an emergency event;
accessing a data log and additional relevant data of the body area network, wherein the additional relevant data comprises a preliminary diagnosis of the nature of the medical emergency; and
transmitting the data log and the additional relevant data over a wireless mobile communication system to an emergency treatment facility or a mobile emergency treatment vehicle or an emergency treatment person.

16. The computer program product of claim 15, wherein the controlling of operation of the vehicle comprises controlling at least one of a plurality of vehicle systems.

17. The computer program product of claim 16, wherein the at least one of the plurality of vehicle systems comprises an autonomous vehicle control system.

18. The computer program product of claim 17, wherein the controlling of the autonomous vehicle control system comprises controlling the autonomous vehicle control system to direct the vehicle to an emergency treatment facility or a mobile emergency treatment vehicle.

19. The computer program product of claim 16, wherein the at least one of the plurality of vehicle systems comprises at least one of the following:
an alarm; and
a door lock.

20. The computer program product of claim 19, wherein the method further comprises:
receiving, by the processor system, a response to transmitting the data log and the additional relevant data, wherein the response comprises response instructions that are based at least in part on the additional relevant data, and wherein the response instructions control the processor system to control the operation of the vehicle in a manner that was selected based at least in part on the additional relevant data.

* * * * *